United States Patent
Burda et al.

(10) Patent No.: US 7,565,218 B2
(45) Date of Patent: Jul. 21, 2009

(54) METHOD AND SYSTEM OF PRIORITIZATION FOR MANAGING MANUFACTURING PROCESSES

(75) Inventors: Richard G. Burda, Pleasant Valley, NY (US); Aseem K. Joshi, Wappingers Falls, NY (US); Sameer T. Shikalgar, Wappingers Falls, NY (US); Susan Kangas van Oss, Lagrangeville, NY (US); Patrick R. Varekamp, Croton on Hudson, NY (US)

(73) Assignee: International Business Machines Corporation, Armonk, NY (US)

(*) Notice: Subject to any disclaimer, the term of this patent is extended or adjusted under 35 U.S.C. 154(b) by 327 days.

(21) Appl. No.: 11/393,027

(22) Filed: Mar. 30, 2006

(65) Prior Publication Data

US 2007/0239302 A1    Oct. 11, 2007

(51) Int. Cl.
*G06F 19/00* (2006.01)
(52) U.S. Cl. .................. 700/101; 700/100; 700/103
(58) Field of Classification Search ........... 700/99–103, 700/106–108, 121; 705/7–9
See application file for complete search history.

(56) References Cited

U.S. PATENT DOCUMENTS

| 6,259,959 | B1 | 7/2001 | Martin | |
|---|---|---|---|---|
| 6,757,621 | B2 * | 6/2004 | Mizuno et al. | 700/121 |
| 6,865,433 | B1 * | 3/2005 | Burda | 700/101 |
| 7,174,232 | B2 * | 2/2007 | Chua et al. | 700/102 |
| 2005/0159835 | A1 * | 7/2005 | Yamada et al. | 700/109 |

OTHER PUBLICATIONS

Stephen J. Shea, et al., "Development and Implementation the Range Management System in a Multi-Flow Fabricator", 1997 IEEE/SEMI Advanced Semiconductor Manufacturing Conference, pp. 398-404.

* cited by examiner

*Primary Examiner*—Charles R Kasenge
(74) *Attorney, Agent, or Firm*—Joseph Petrokaitis; Greenblum & Bernstein P.L.C.

(57) ABSTRACT

A system and method are disclosed for prioritizing a plurality of lots in a manufacturing process. Portions of a priority for each lot are created. The portions are combined to form a unique range priority for each lot. The range priorities may be used to equitable compare all of the active lots in a fabrication facility. The system and method may be implemented as part of a range management system.

20 Claims, 6 Drawing Sheets

METHOD AND SYSTEM OF PRIORITIZATION FOR MANAGING MANUFACTURING PROCESSES

FIELD OF THE INVENTION

The invention relates generally to the management of manufacturing processes, and more particularly to prioritization for automated lot dispatching in a factory controlled by range management.

BACKGROUND OF INVENTION

Semiconductor manufacturers are continually working to reduce time-to-market in an effort to improve serviceability while decreasing operating costs. This is particularly true for fabrication facilities that produce high volumes (on the order of 1,000 wafer starts per day) of complex products. As such, efforts have been made to develop and implement systems and methods such as continuous flow manufacturing, including operations management, which is also known as range management.

In range management systems, wafer processing is partitioned into a series of flows, where the products in each flow follow similar routes through the fabrication facility. These flows are divided into ranges, and each range may include one or more operations. An operation is where the units (e.g., wafers) of a production lot are actually worked on, and may include, for example: lithography, metrology, overlay, metrology CD, etc. Normally, a particular lot spends twenty-four hours in a range, and then is moved to the next range. Of the twenty-four hours, the lot may, for example, undergo six hours of processing time in the operations of the range, sixteen hours of non-processing time waiting in a queue, and two hours of transit time being moved between operations and/or other ranges. Thus, it is possible for numerous lots to be processed through a single range a twenty-four hour period.

Typically, new production lots are started every day, and a particular lot may undergo processing in seventy or more ranges before it is complete. Also, different lots may result in different end products, thereby requiring different operations during their manufacture. As such, there may be thousands of active lots in the fabrication facility at any one time, with those lots being dispersed amongst the numerous operations of the fabrication facility.

Range management systems are used to manage the flow of the production lots through the fabrication facility. Range management systems focus on delivering work in progress (WIP) (e.g., lots or units in a lot) on a known route at a known speed to meet committed customer deliveries on schedule. In conventional range management implementations, operators that run the various operations are given target volumes for the day and are expected to dispatch lots, as they are available, to achieve the target. There are two drawbacks associated with such implementations of range management. The first is one of control, because it is difficult to ensure that individual operators are attempting to meet the range targets. The second concerns visibility. Even if individual operators are attempting to meet the range targets, it is difficult for them to decide which lots to run to most efficiently achieve the target.

Problems with conventional range management systems also arise when a fabrication facility has alternate priority schemes that compete with range targets. In such cases, operators are forced to decide whether it is more important to run lots to achieve the range target or run a lot given a high priority for another reason (e.g., a late lot, hot lot, etc.).

Further problems arise when WIP travels along non-standard (e.g., branch) routes, because existing range management systems cannot control WIP flow accurately unless the route is known.

Accordingly, there exists a need in the art to overcome the deficiencies and limitations described hereinabove.

SUMMARY OF THE INVENTION

In a first aspect of the invention, a method includes identifying at least a first lot and a second lot of a plurality of lots, assigning separately first indicia to the first lot and the second lot based on a first criteria, and assigning separately second indicia to the first lot and the second lot based on a second criteria. The method further includes creating a first range priority by combining at least the first indicia and the second indicia of the first lot, and creating a second range priority by combining at least the first indicia and the second indicia of the second lot. The method further includes processing the first lot and the second lot relative to one another based on the first range priority and the second range priority. The method may be performed by a computer program product.

In a second aspect of the invention, a method of prioritizing a plurality of lots for dispatching in a fabrication facility controlled by range management includes identifying each lot of the plurality of lots, and assigning each lot of the plurality of lots to one of a plurality of ranges. The method further includes obtaining a raw process time to end of range for each lot of the plurality of lots, and obtaining a range target for each range of the plurality of ranges. The method also includes creating a lot tag indicator for each lot of the plurality of lots based on the raw process time to end of range for each lot of the plurality of lots, and creating a range completion percentage for each lot of the plurality of lots based on the range target for each range of the plurality of ranges. The method further includes creating a unique range priority for each lot of the plurality of lots by combining at least the lot tag indicator and the range completion percentage for each lot of the plurality of lots.

In a third aspect of the invention, a system for prioritizing a plurality of lots includes at least one device that performs identifying each lot of the plurality of lots. The at least one device further performs, for each lot of the plurality of lots: creating a first portion and a second portion of a priority, wherein the first portion and the second portion are based on first criteria and second criteria associated with each lot of the plurality of lots; and combining at least the first portion and the second portion of the priority to create a range priority for the each lot in order to process the lots of the plurality of lots relative one another. The at least one device may include a computer usable medium including a computer readable program, wherein the computer readable program, when executed on a computer, causes the computer to perform the identifying, the creating, and the combining.

BRIEF DESCRIPTION OF THE DRAWINGS

The foregoing will be better understood from the following detailed description of embodiments of the invention with reference to the drawings, in which.

DETAILED DESCRIPTION OF EMBODIMENTS OF THE INVENTION

The invention is directed to a system and method for managing manufacturing processes. According to the invention, a unique priority may be created for each lot in a fabrication facility. In this manner, information is provided that facilitates a determination of which lots should be prioritized within a range to achieve a daily target, and how lots chosen to exit a range should be prioritized against other chosen lots from different ranges when vying for the same factory resource (e.g., tool, fixture, vehicle, etc.). Embodiments may be implemented in an automated dispatching system which provides more control and visibility to the lots that need to be chosen to meet the range targets for each day.

Figure 1:
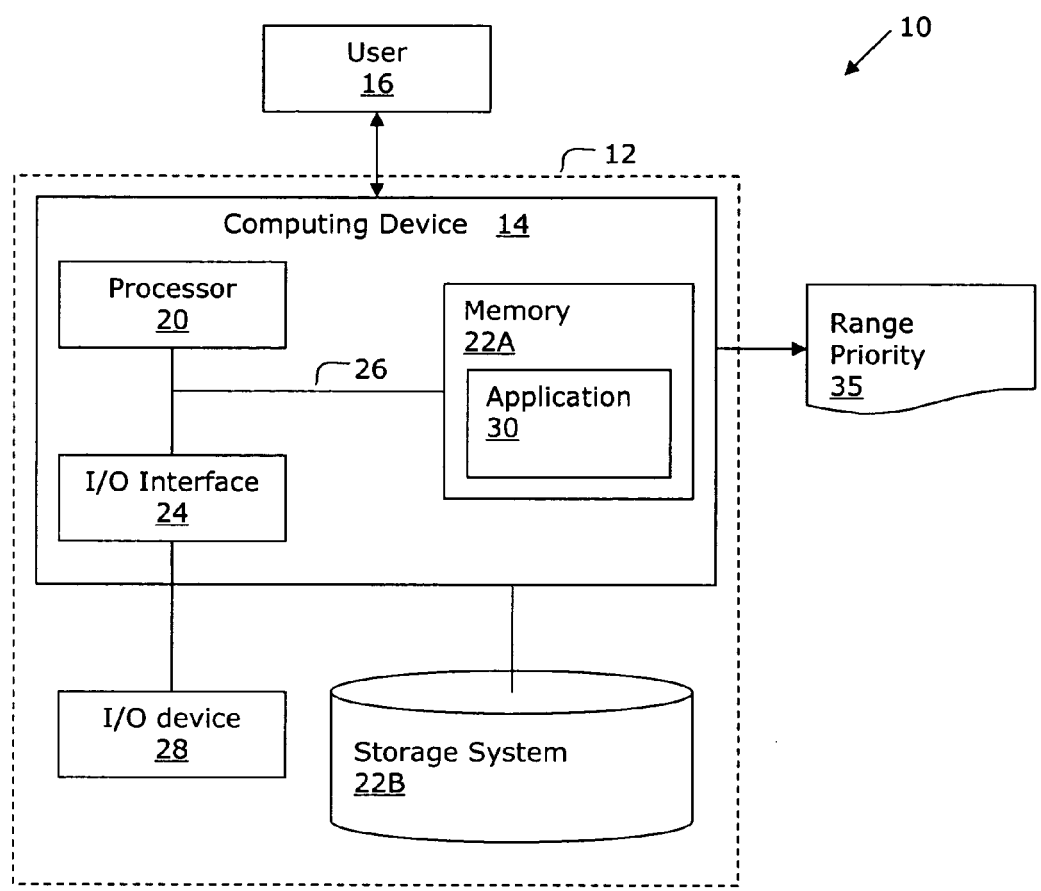
FIG. 1 shows an environment of the invention.

FIG. 1 shows an illustrative environment 10 for managing the processes in accordance with embodiments of the invention. To this extent, the environment 10 includes a computer infrastructure 12 that can perform the processes described herein, such as, for example, managing manufacturing processes in a facility. In particular, the computer infrastructure 12 is shown including a computing device 14 that comprises an application 30, which makes computing device 14 operable to perform the processes described herein. The computing device 14 is shown including a processor 20, a memory 22A, an input/output (I/O) interface 24, and a bus 26. Further, the computing device 14 is shown in communication with an external I/O device/resource 28 and a storage system 22B. As is known in the art, in general, the processor 20 executes computer program code, which is stored in memory 22A and/or storage system 22B. While executing computer program code, the processor 20 can read and/or write data to/from memory 22A, storage system 22B, and/or I/O interface 24. The bus 26 provides a communications link between each of the components in the computing device 14. The I/O device 28 can comprise any device that enables an individual to interact with the computing device 14 or any device that enables the computing device 14 to communicate with one or more other computing devices using any type of communications link.

In any event, the computing device 14 can comprise any general purpose computing article of manufacture capable of executing computer program code installed thereon (e.g., a personal computer, server, handheld device, etc.). However, it is understood that the computing device 14 is only representative of various possible equivalent computing devices that may perform the processes described herein. To this extent, in other embodiments, the functionality provided by computing device 14 can be implemented by a computing article of manufacture that includes any combination of general and/or specific purpose hardware and/or computer program code. In each embodiment, the program code and hardware can be created using standard programming and engineering techniques, respectively.

Similarly, the computer infrastructure 12 is only illustrative of various types of computer infrastructures for implementing the invention. For example, in one embodiment, the computer infrastructure 12 comprises two or more computing devices (e.g., a server cluster) that communicate over any type of communications link, such as a network, a shared memory, or the like, to perform the process described herein. Further, while performing the process described herein, one or more computing devices in the computer infrastructure 12 can communicate with one or more other computing devices external to computer infrastructure 12 using any type of communications link. In either case, the communications link can comprise any combination of various types of wired and/or wireless links; comprise any combination of one or more types of networks (e.g., the Internet, a wide area network, a local area network, a virtual private network, etc.); and/or utilize any combination of various types of transmission techniques and protocols. As discussed herein, the application 30 enables computer infrastructure 12 to create the range priorities 35.

Figure 2A:
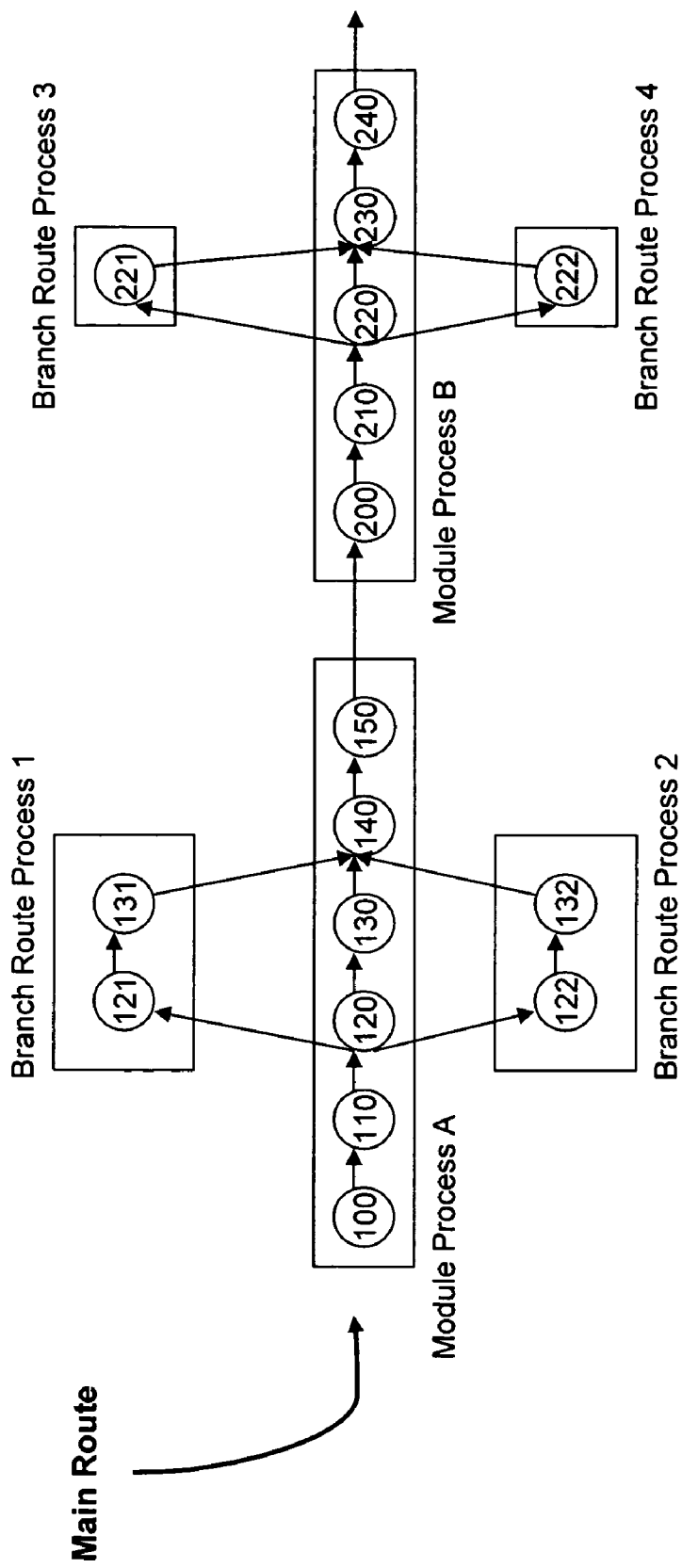
FIGS. 2A-2B show an aspect of the invention.

FIG. 2A shows an exemplary manufacturing process with disconnected process flow. The manufacturing process may be, for example, the manufacture of silicon wafers. The manufacturing process is mapped along a main route which may be divided into any number of separate sub-processes. For example, as shown in FIG. 2A, the exemplary main route is divided into two sub-processes, Module Process A and Module Process B. Sub-processes may be further divided into logical subdivisions of the manufacturing process, such as, for example, ranges. FIG. 2A shows ranges 100, 110, 120, 130, 140, and 150 of Module Process A, and ranges 200, 210, 220, 230, and 240 of Module Process B.

It is quite common to spend significant development resources on alternative branch routes after the main route has been established. For example, some developmental WIP may be diverted from the main route to a branch route for the purpose of performing research and/or experimentation on the developmental WIP. Such research and/or experimentation may lead to yield and/or performance improvements for the product. FIG. 2A shows branch routes Branch Route Process 1 and Branch Route Process 2 stemming from the main route in Module Process A. FIG. 2A also shows branch routes Branch Route Process 3 and Branch Route Process 4 stemming from the main route in Module Process B.

Each branch route is shown with a departure and return point, and also shown with ranges. A departure point is where the particular developmental WIP departs from the main route. A return point is where the developmental WIP returns to the main route. A branch route range 121, 131 may include one or more operations that are performed on the developmental WIP along the branch route. The branch route departure and return points and ranges depicted in FIG. 2A are exemplary, and are determined by the developmental needs of the fabrication facility.

Figure 2B:
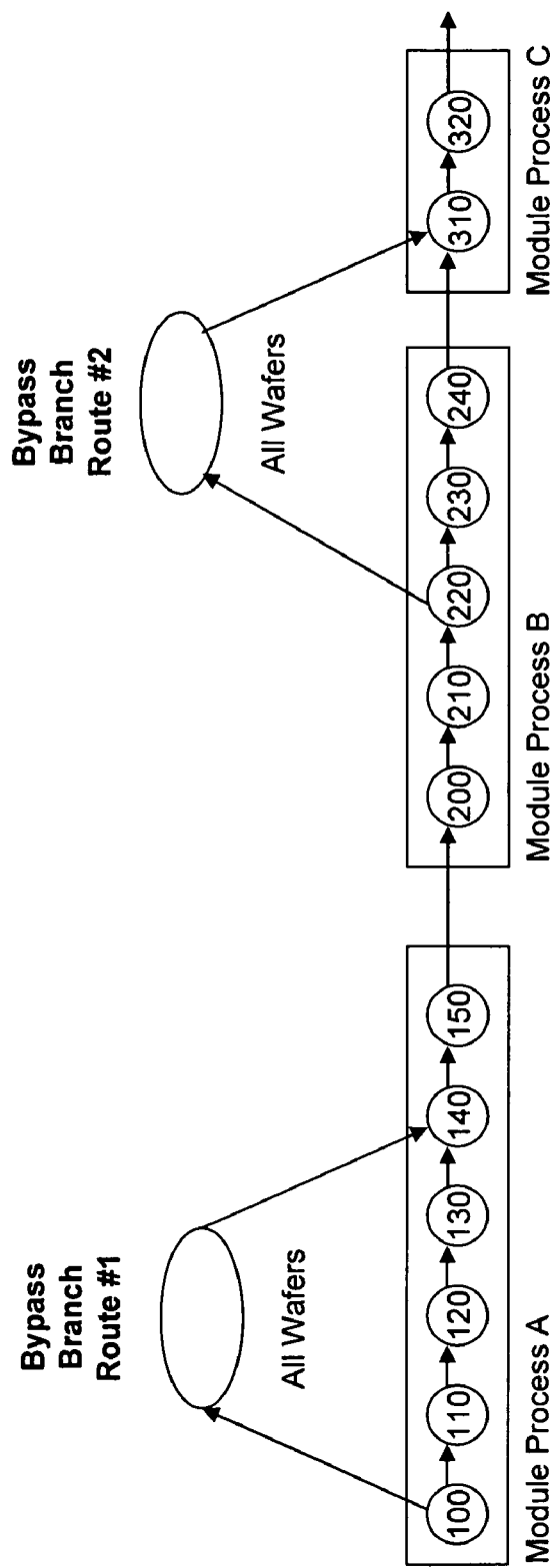

FIG. 2B shows another example of a main route and branch routes. The main route includes Module Process A, Module Process B, and Module Process C, which include the depicted ranges. In the example shown in FIG. 2B, the branch routes constitute bypass routes because all of the wafers are diverted off of the main route through the branch routes. Such a situation may arise, for example, when a modification must be done to all of the lots of WIP after production has already begun.

Often, branch routes, such as those depicted in FIGS. 2A and 2B, are less well-defined than a main route. This is because the individual operations performed along a branch route, such as research and experimentation, are often ad hoc. Embodiments of the invention provide for managing production WIP (e.g., along a main route) as well as developmental WIP (e.g., along a branch route), which would often substantially impact the ability of a range management system to control the flow. Thus, accurate scheduling and management of the facilities may be achieved and commitments to customers can be met by implementing the invention.

In accordance with the invention, developmental WIP may be treated similarly to production WIP, allowing efficient management of the fabrication facility. For example, as shown in FIG. 2A, the Branch Route Process 1 returns to the main route at range 140. According to embodiments of the invention, the developmental WIP in Branch Route Process 1 is treated as if it were in range 140. In this manner, lots in the same range, whether on the main route or any branch route, can be moved together and prioritized against one another throughout the range day.

Figure 3A:
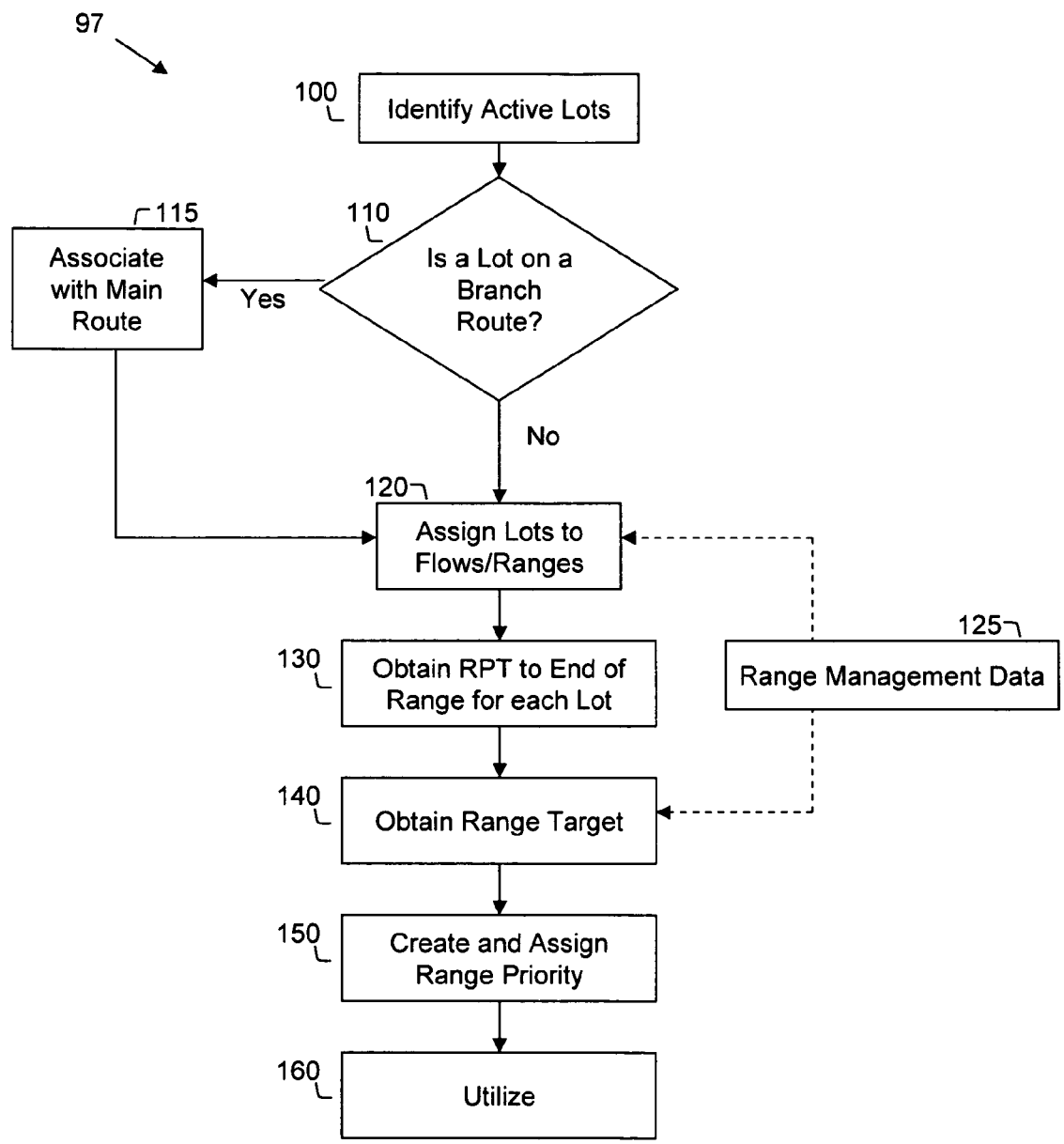
FIGS. 3A-3B show a further aspect of the invention.

FIG. 3A is a flow diagram implementing steps of the invention. FIG. 3A may equally represent a high-level block diagram of the invention. The steps of FIG. 3A (and all of the flow diagrams) may be implemented and executed from either a server, in a client server relationship, or they may run on a user workstation with operative information conveyed to the user workstation to create the navigation outlined above. Additionally, the invention can take the form of an entirely hardware embodiment, an entirely software embodiment or an embodiment containing both hardware and software elements, or the invention can be executed entirely or partially manually. The steps of FIG. 3A (and all other flow diagrams) may also be representative of a high-level block diagram implementing the steps thereof.

In an embodiment, the invention is implemented in software, which includes but is not limited to firmware, resident software, microcode, etc. Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD. The processes described herein can be implemented in the infrastructure shown in FIG. 1.

Figure 3B:
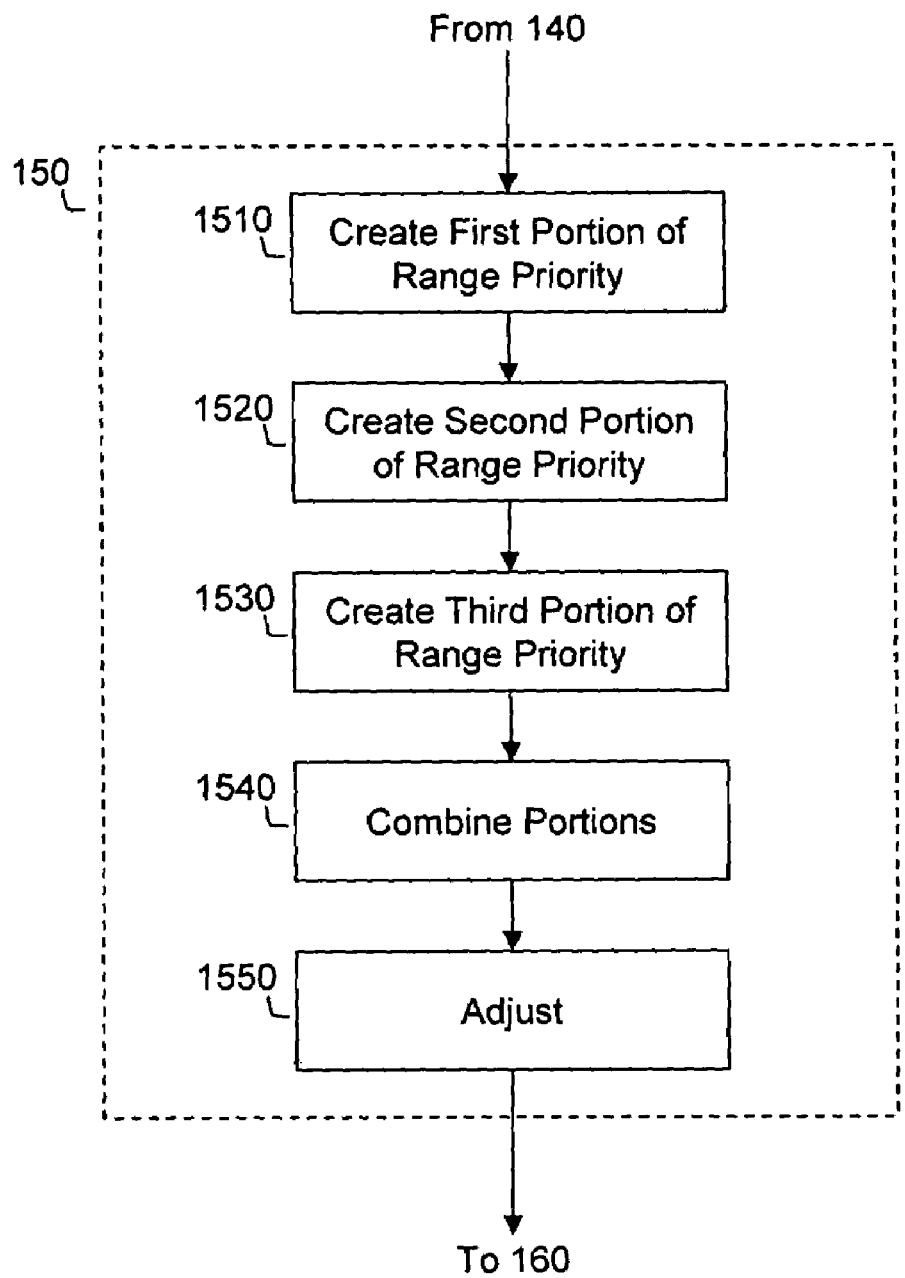

FIGS. 3A-3B show a flow diagram depicting a prioritization system 97 and method for calculating lot range priorities according to embodiments of the invention. At step 100, all of the active lots are identified. This may include, for example, identifying every lot that is currently in any stage of production in the fabrication facility, including developmental WIP. The lots are identified by accessing existing data of the fabrication facility, for example. The existing data may be, for example: a conventional floor control system; a database that tracks all of the lots in the fabrication facility; a range management system that monitors the lots, operations, ranges, and flows of a fabrication facility; or a combination of any such systems. The system 97 and method may access the existing data via the I/O device 28 or in any other known manner. Step 100 may be performed at any time interval as determined by the needs of the fabrication facility. For example, the active lots may be identified twice a day, or hourly, or every half hour, etc.

At steps 110 and 115, lots that are on branch routes are associated with a main route. More particularly, at step 110, route information for each lot is retrieved from the existing data. The existing data contains information regarding which route a particular lot is on, and where branch routes depart from and return to main routes. If a lot is on a branch route, then, at step 115, that lot is associated to the main route from which the branch route diverted. In this way, all of the active lots that are on branch routes are associated with a main route.

Still referring to FIG. 3A, at step 120, each lot is assigned to a flow and a range. For example, lots that are in main routes are assigned to the flow and range that they are currently located within. Lots that are in branch routes, but associated with a main route at step 115, are assigned to the flow and range where the branch route returns to the main route. The information regarding which route and range a lot is in is available from range management data 125. The range management data 125 may be part of a range management system which is any type of lean manufacturing system, such as, for example, IFS APPLICATIONS by IFS, of Schaumburg, Ill. The range management data 125 may include information such as flow definitions and range definitions. In this manner, each lot is assigned to a flow and a range.

At step 130, the raw process time (RPT) to end of range is obtained for each lot. More particularly, the raw process time to end of range is the raw process time for that range minus any process time that has already occurred on the lot in the range. In implementations, the raw process time is the minimum time required to process a lot through all of the operations of a particular range. The raw process time may include "work" time for which the lot is worked on in the operations of a range, and preferably does not include "non-work" time, such as waiting in a queue, transit, etc. It is contemplated, though, that raw process time may be calculated in other manners, including non-work times, depending on a particular application of the invention.

In embodiments, the raw process time to end of range may be determined from information that is available from the existing data. More particularly, the operations included in each range, the process time of each operation, and the amount of actual processing time that a lot has undergone in its range are all available from the existing data. The raw process time to end of range for a lot generally corresponds to how close the lot is to completion of its range.

Range targets are obtained at step 140. In embodiments, the range target is a daily range target which corresponds to the number of lots that a particular range is scheduled to process during the day. For example, a range may be scheduled to process seven different lots in the current day. The daily range target for each range is retrieved from the range management data 125.

Still referring to FIG. 3A, a unique range priority is created and assigned to each lot, at step 150. The range priority for a lot may be based on factors such as, for example, the location of the lot within its range, the completion rate of the range, and the time of entry of the lot into its current operation. After all of the lots have been assigned a range priority, the range priority of any particular lot, or lots, may be adjusted.

Lastly, at step 160, the range priority for each lot is utilized. Utilization may include, for example, forwarding all of the range priorities to a dispatcher. The dispatcher may be a supervisor or automated system, such as a floor control system and/or a range management system, which guides the individual operations of the fabrication facility by directing the operations to work on lots in a prescribed order based on the range priorities of the lots. In this manner, the system and method of the invention provides information in the form of a unique range priority for each lot, which may be used to equitably compare lots to enhance manufacturing.

FIG. 3B shows non-limiting exemplary details of step 150, in which a unique range priority is created and assigned to each lot. At step 1510, a first portion of a range priority is created for each lot. The first portion may be a single number, letter, or other indicia, or any combination of numbers, letters, and/or other indicia. In embodiments, the first portion includes a tag. The tag may be based on the range target for each range and the raw process time to end of range for each lot. In this manner, lots that are more likely to exit their range within an expected time period are given a different tag from lots that are less likely to exit their range within the expected time period.

At step 1520, a second portion of the range priority is created. The second portion may be a single number, letter, or other indicia, or any combination of numbers, letters, and/or other indicia. In embodiments, the second portion includes a range completion percentage. The range completion percentage is based upon the number of lots that have actually moved through the range and the range target. Lots in ranges with a lower range completion percentage may be given a higher processing priority, thus providing equitable dispatching of fabrication facility resources across different products.

At step 1530, a third portion of the range priority is created. The third portion may be a single number, letter, or other indicia, or any combination of numbers, letters, and/or other indicia. In embodiments, the third portion includes a ranking that is based upon the order in which each lot arrived at its current operation. For example, lots that arrived at their operation earlier are given a higher processing priority ranking than lots that arrived later.

At step 1540, the portions of the unique range priority are combined. More particularly, the first, second, and third portions from steps 1510, 1520, and 1530 are concatenated to form a unique range priority for each lot. While three portions have been described, the range priority may include any desired number of portions. Furthermore, the portions need not necessarily be combined by concatenation. Alternatively, for example, the portions could be summed, multiplied, etc.

Lastly, at step 1550, the range priority of any lot may be adjusted. The adjustment may comprise changing any aspect of the already assigned portions or the combination of portions. An adjustment may be made by personnel or by an automated system. An adjustment may be made, for example, because a particular lot must be finished that day—so its range priority would be adjusted to result in a very high processing priority over the other lots in the fabrication facility.

EXAMPLE OF USE

Figure 4:
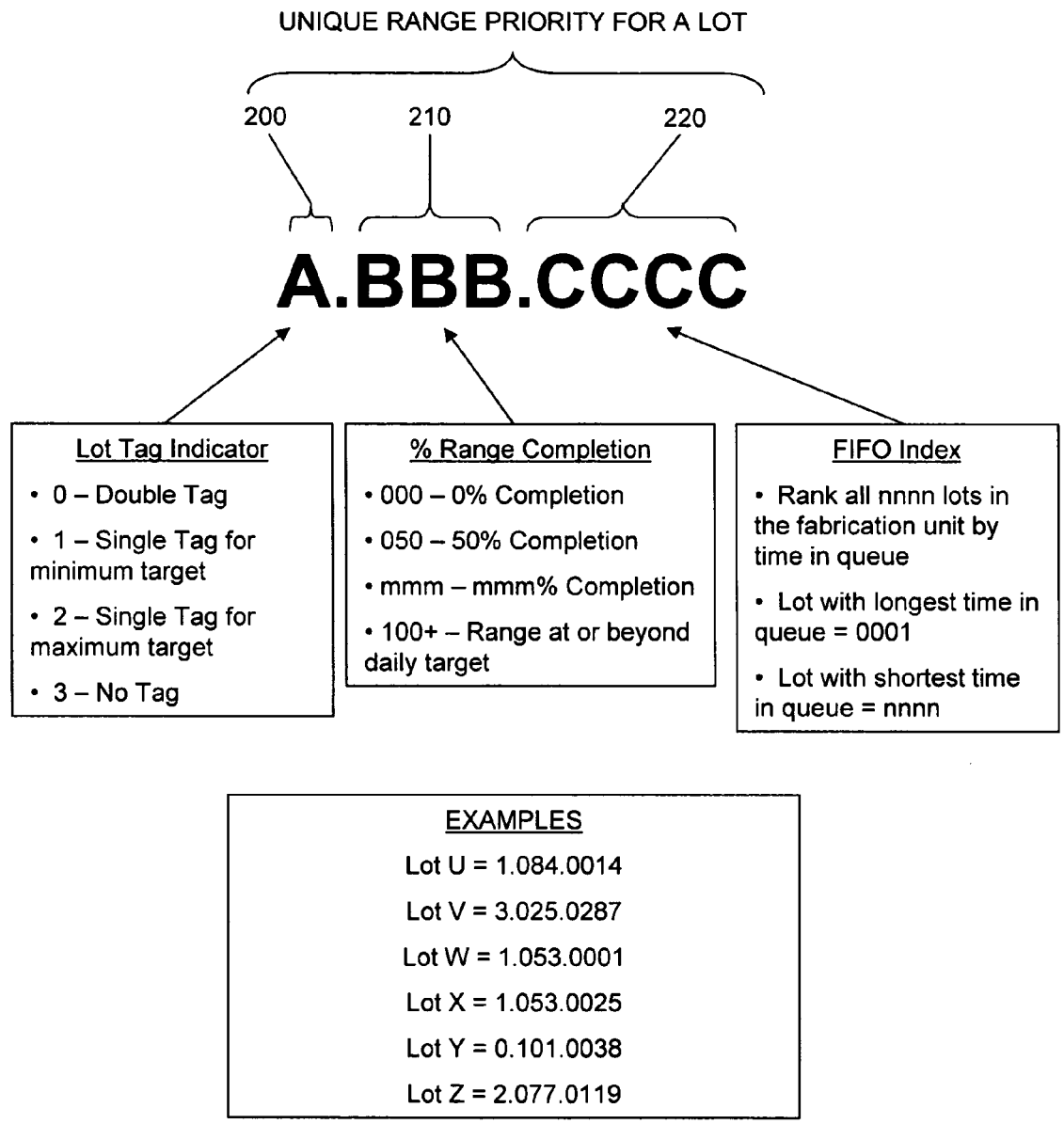
FIG. 4 shows an exemplary prioritization according to the invention.

FIG. 4 shows an exemplary range priority according to embodiments of the invention. A unique range priority in this form is created for each active lot in the fabrication facility every time step 150 is performed. Thus, for instance, each active lot may have a unique range priority created for it and assigned to it every half hour.

The range priority includes a first portion 200, second portion 210, and third portion 220. The portions are integer values that are created and combined together. The combined portions constitute a unique range priority for a particular lot. In embodiments, the numerical value of the range priority of a lot is inversely proportional to the processing priority for that lot across the entire fabrication facility. For example, Lot X has a range priority of "1.053.0025", and Lot Y has a range priority of "0.101.0038". The range priority of Lot Y is lower in numerical value than that of Lot X. Accordingly, if Lot Y and Lot X are vying for the same fabrication facility resource (e.g., both are waiting in a queue for the same lithography device), then Lot Y will be processed before Lot X.

In the example shown in FIG. 4, the first portion 200, depicted as "A", is a lot tag indicator. Information from the existing data and/or range management data 125 is used as the basis for assigning a tag to each lot. The tag may be based upon the raw process time to end of range for the lot, or may be based on other factors, such as how many ranges a lot is targeted to complete in the day.

In the example, the tag has a value of 0, 1, 2, or 3. A tag value of 0 corresponds to a "double tag", which indicates that the particular lot must undergo two ranges that day. The double tag may be used, for example, when production has fallen behind schedule and the lot is targeted for speeding up. In the current example, the double tag corresponds to a higher processing priority for a lot. A tag value of "1" corresponds to a "single tag for minimum target", which indicates that the lot must go through one range within a prescribed time period. A tag value of "2" corresponds to a "single tag for maximum target", which indicates that the lot has already completed a first range within the prescribed time period and is ready to enter its second range. For example, a lot that is targeted to go through two ranges because production has fallen behind schedule is initially tagged as "0". After that lot completes its first range, the tag is changed from "0" to "2". Lastly, a tag value of "3" corresponds to no tag, which, in the current example, corresponds to the lowest processing priority for a lot.

Still referring to the example shown in FIG. 4, the second portion 210, depicted as "BBB", is a range completion percentage. The range completion percentage is calculated as the ratio of how many lots a range has processed (available from the existing data and/or the range management data 125) to the daily range target (or the prescribed time period) of the range. This portion prioritizes ranges that are less complete over ranges that are more complete.

Still referring to the example shown in FIG. 4, the third portion 210, depicted as "CCCC", is a first-in-first-out (FIFO) index. Information from the existing data is used to rank all of the active lots in the fabrication facility based on the order that each lot arrived at its current operation. The one lot in the fabrication facility that has the longest time in a queue is assigned "0001". For instance, the one lot that has the shortest time in a queue is assigned "nnnn", where nnnn is the total number of active lots in the fabrication facility. In this manner, lots that arrived first at an operation (e.g., have been waiting longer in a queue) are given a higher processing priority.

As further shown in FIG. 4, the portions are concatenated to form a single string of characters "A.BBB.CCCC". The concatenation of parameters creates a unique range priority for each active lot in the fabrication facility, which provides a uniform and equitable manner to compare different routes and products.

Thus, for the examples provided in FIG. 4, where range priority is inversely proportional to processing priority: Lot Y has the highest processing priority, Lot W the second highest, Lot X the third highest, Lot U the fourth highest, Lot Z the fifth highest, and Lot V the lowest. It is understood, however, that the examples shown are merely exemplary, and that other arrangements could be used. For example, a range priority could be comprised of two portions of letters instead of numbers, and the range priority may be directly proportional to the processing priority instead of inversely proportional.

After the combination step, the range priority shown in FIG. 4 may be adjusted. For example, the tag value of "3" for Lot V may be changed to a value of "0", thereby lowering its range priority and raising its processing priority. An adjustment may be made manually or by an automated system. An adjustment may be made for any reason, such as, for example, a change in the delivery date of the lot.

In embodiments, the range priorities are updated periodically as changes occur in WIP and range completions. This focuses fabrication facility resources towards lots that are needed to achieve range targets each day, which promotes consistent movement of lots on different routes.

Embodiments of the invention may be implemented as an independent entity or as part of a computer integrated production system. Embodiments may be directly integrated into a range management system or a manufacturing execution system (MES), as is commonly used in directing the production of semiconductor fabrication. Although the invention has been described with respect to semiconductor fabrication, it is understood that embodiments could be employed in other manufacturing processes, such as, for example, automobile manufacture.

The method as described above may be used in the fabrication of integrated circuit chips. The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

While the invention has been described in terms of embodiments, those skilled in the art will recognize that the invention can be practiced with modifications and in the spirit and scope of the appended claims.

What is claimed:

1. A method, comprising:
  identifying at least a first lot and a second lot of a plurality of lots;
  assigning separately first indicia to the first lot and the second lot based on a first criteria, wherein the first criteria corresponds to a range completion percentage;
  assigning separately second indicia to the first lot and the second lot based on a second criteria, wherein the second criteria corresponds to a first-in-first-out index;
  creating a first range priority by combining at least the first indicia and the second indicia of the first lot;
  creating a second range priority by combining at least the first indicia and the second indicia of the second lot; and
  processing the first lot and the second lot relative to one another based on the first range priority and the second range priority.

2. The method of claim 1, wherein the plurality of lots includes at least a third lot; and further comprising:
  assigning first indicia to the third lot based on the first criteria;
  assigning second indicia to the third lot based on the second criteria; creating a third range priority by combining at least the first indicia and the second indicia of the third lot; and
  processing the third lot relative the first lot and the second lot based on the first range priority, the second range priority, and the third range priority.

3. The method of claim 1, further comprising assigning separately third indicia to the first lot and the second lot based on a third criteria, wherein:
  the creating a first range priority comprises combining the first indicia, the second indicia, and the third indicia of the first lot; and
  the creating a second range priority comprises combining the first indicia, the second indicia, and the third indicia of the second lot.

4. The method of claim 3, wherein:
  the combining the first indicia, the second indicia, and the third indicia of the first lot comprises concatenating the first indicia, the second indicia, and the third indicia of the first lot; and
  the combining the first indicia, the second indicia, and the third indicia of the second lot comprises concatenating the first indicia, the second indicia, and the third indicia of the second lot.

5. The method of claim 3, wherein:
  the third criteria corresponds to a lot tag indicator.

6. The method of claim 5, wherein:
  the combining the first indicia and the second indicia of the first lot comprises concatenating the first indicia and the second indicia of the first lot; and
  the combining the first indicia and the second indicia of the second lot comprises concatenating the first indicia and the second indicia of the second lot.

7. The method of claim 1, wherein:
  the combining the first indicia and the second indicia of the first lot comprises concatenating the first indicia and the second indicia of the first lot; and
  the combining the first indicia and the second indicia of the second lot comprises concatenating the first indicia and the second indicia of the second lot.

8. The method of claim 1, further comprising repeating the identifying, the assigning separately first indicia, the assigning separately second indicia, the creating a first range priority, and the creating a second range priority at predetermined time intervals throughout a predetermined time period, such that the first range priority and the second range priority are repeatedly updated throughout the predetermined time period.

9. The method of claim 1, further comprising adjusting at least one of the first range priority and the second range priority.

10. A method, comprising:
  identifying at least a first lot and a second lot of a plurality of lots;
  assigning separately first indicia to the first lot and the second lot based on a first criteria;
  assigning separately second indicia to the first lot and the second lot based on a second criteria;
  creating a first range priority by combining at least the first indicia and the second indicia of the first lot;
  creating a second range priority by combining at least the first indicia and the second indicia of the second lot;
  processing the first lot and the second lot relative to one another based on the first range priority and the second range priority; and
  assigning separately third indicia to the first lot and the second lot based on a third criteria,
  wherein the creating a first range priority comprises combining the first indicia, the second indicia, and the third indicia of the first lot;
  the creating a second range priority comprises combining the first indicia, the second indicia, and the third indicia of the second lot;
  the first criteria corresponds to number of ranges to be processed in, or raw process time to end of range;
  the second criteria corresponds to range completion percentage; and
  the third criteria corresponds to time of entry of into a current operation.

11. A computer program product comprising a computer program stored in one of:
semiconductor or solid state memory, magnetic tape, a removable computer diskette, a random access memory (RAM), a read-only memory (ROM), a rigid magnetic disk, or an optical disk, wherein execution of the computer program causes a computer to:
- identify at least a first lot and a second lot of a plurality of lots;
- assign separately first indicia to the first lot and the second lot based on a first criteria, wherein the first criteria corresponds to a range completion percentage;
- assign separately second indicia to the first lot and the second lot based on a second criteria, wherein the second criteria corresponds to a first-in-first-out index;
- create a first range priority by combining at least the first indicia and the second indicia of the first lot;
- create a second range priority by combining at least the first indicia and the second indicia of the second lot; and
- process the first lot and the second lot relative to one another based on the first range priority and the second range priority.

12. A method of prioritizing a plurality of lots for dispatching in a fabrication facility controlled by range management, comprising:
- identifying each lot of the plurality of lots;
- assigning each lot of the plurality of lots to one of a plurality of ranges;
- obtaining a raw process time to end of range for each lot of the plurality of lots;
- obtaining a range target for each range of the plurality of ranges;
- based on the raw process time to end of range for each lot of the plurality of lots, creating a lot tag indicator for each lot of the plurality of lots;
- based on the range target for each range of the plurality of ranges, creating a range completion percentage for each lot of the plurality of lots; and
- creating a unique range priority for each lot of the plurality of lots by combining at least the lot tag indicator and the range completion percentage for each lot of the plurality of lots, wherein the creating the unique range priority is performed by a computing device comprising a processor.

13. The method of claim 12, further comprising creating a first-in-first-out index for each lot of the plurality of lots based on time of entry of into a current operation;
wherein the creating comprises combining the lot tag indicator, the range completion percentage, and the first-in-first-out index for each lot of the plurality of lots.

14. The method of claim 12, wherein the combining comprises concatenating at least the lot tag indicator and the range completion percentage for each lot of the plurality of lots.

15. The method of claim 12, further comprising: determining whether each lot of the plurality of lots is on a branch route or a main route; and
assigning any lot of the plurality of lots that is on said branch route to a location on said main route.

16. A system for prioritizing a plurality of lots, comprising a computer comprising hardware, wherein the computer performs:
- identifying each lot of the plurality of lots; and
- for each lot of the plurality of lots: creating a first portion, a second portion and a third portion of a priority, wherein the first portion, the second portion and the third portion are based on first criteria, second criteria and third criteria associated with each lot of the plurality of lots, respectively; and
- combining at least the first portion, the second portion and the third portion of the priority to create a range priority for the each lot in order to process the lots of the plurality of lots relative one another
wherein the first criteria corresponds to a lot tag indicator;
the second criteria corresponds to a range completion percentage; and
the third criteria corresponds to a first-in-first-out index.

17. The system of claim 16, wherein the computer repeats the identifying, the creating, and the combining at predetermined time intervals throughout a predetermined time period, such that the range priority of each lot of the plurality of lots is repeatedly updated.

18. The system of claim 16, wherein the computer is utilized in a range management system or in a manufacturing execution system.

19. The system of claim 16, wherein: the computer comprises a computer usable medium including a computer readable program; and
the computer readable program, when executed on the computer, causes the computer to perform the identifying, the creating, and the combining steps.

20. The system of claim 16, wherein: the combining comprises concatenating the first portion, the second portion, and the third portion of the priority for each lot.

* * * * *